(12) United States Patent  
Lamusga (10) Patent No.: US 10,060,294 B2  
(45) Date of Patent: Aug. 28, 2018

(54) GAS TURBINE ENGINE ASSEMBLIES WITH CERAMIC MATRIX COMPOSITE COMPONENTS HAVING UNDULATED FEATURES

(71) Applicant: Rolls-Royce High Temperature Composites, Inc., Huntington Beach, CA (US)

(72) Inventor: Joseph P. Lamusga, Indianapolis, IN (US)

(73) Assignee: Rolls-Royce High Temperature Composites Inc., Indianapolis, IN (US)

( * ) Notice: Subject to any disclaimer, the term of this patent is extended or adjusted under 35 U.S.C. 154(b) by 328 days.

(21) Appl. No.: 15/130,253

(22) Filed: Apr. 15, 2016

(65) Prior Publication Data

US 2017/0298777 A1    Oct. 19, 2017

(51) Int. Cl.
| | |
|---|---|
| *F01D 11/08* | (2006.01) |
| *F01D 25/28* | (2006.01) |
| *F01D 25/00* | (2006.01) |
| *F01D 9/02* | (2006.01) |

(52) U.S. Cl.
CPC .............. *F01D 25/28* (2013.01); *F01D 9/02* (2013.01); *F01D 11/08* (2013.01); *F01D 25/005* (2013.01); *F05D 2220/32* (2013.01); *F05D 2240/11* (2013.01); *F05D 2300/6033* (2013.01)

(58) Field of Classification Search
CPC ................................ F01D 11/08; F01D 25/246
See application file for complete search history.

(56) References Cited

U.S. PATENT DOCUMENTS

| | | | | |
|---|---|---|---|---|
| 4,759,687 | A * | 7/1988 | Miraucourt | ............. F01D 11/08 415/127 |
| 5,080,557 | A * | 1/1992 | Berger | .................... F01D 11/08 277/411 |
| 6,786,488 | B2 * | 9/2004 | Laurello | ................. F01D 11/00 277/355 |
| 7,908,867 | B2 | 3/2011 | Keller et al. | |
| 8,202,588 | B2 | 6/2012 | Keller et al. | |
| 2015/0377035 | A1 | 6/2015 | Freeman et al. | |
| 2015/0377050 | A1 | 12/2015 | Freeman et al. | |

* cited by examiner

*Primary Examiner* — Justin Seabe
(74) *Attorney, Agent, or Firm* — Barnes & Thornburg LLP (57) ABSTRACT

An assembly adapted for use in a gas turbine engine is disclosed herein. The assembly includes a first component including metallic materials and a second component including ceramic matrix composite materials. A portion of the second component is configured to engage a portion of the first component directly so that the second component is supported in a predetermined position.

20 Claims, 4 Drawing Sheets

GAS TURBINE ENGINE ASSEMBLIES WITH CERAMIC MATRIX COMPOSITE COMPONENTS HAVING UNDULATED FEATURES

FIELD OF THE DISCLOSURE

The present disclosure relates generally to gas turbine engines, and more specifically to assemblies for gas turbine engines with ceramic matrix composite components.

BACKGROUND

Some assemblies used in gas turbine engines may include components comprising ceramic matrix composite material. During use of those assemblies, ceramic matrix composite components may experience stresses approaching or even exceeding the stresses allowed by the ceramic matrix composite material. Increasing the strength and/or rigidity of such ceramic matrix composite components when used in the assemblies may therefore be desirable.

SUMMARY

The present disclosure may comprise one or more of the following features and combinations thereof.

According to one aspect of the present disclosure, a turbine shroud may include a carrier and a blade track segment. The carrier may include a carrier segment formed to include a bracket. The blade track segment may comprise ceramic matrix composite material and may include a runner extending about a central axis and a hanger extending outwardly in a radial direction away from the runner. The hanger may have an undulated portion adapted to stiffen the hanger that has an arcuate peak and a pair of arcuate troughs interconnected with the arcuate peak and arranged opposite one another. The pair of arcuate troughs may be configured to engage the bracket directly so that the blade track segment is supported by the carrier segment.

In some embodiments, the undulated portion may define a radially-outermost end of the blade track segment. The arcuate peak and the pair of arcuate troughs may extend outwardly away from a portion of the hanger located radially inward of the radially-outermost end of the blade track segment along the central axis such that the arcuate peak, the pair of arcuate troughs, and the runner cooperate to at least partially define an overhang.

In some embodiments, the bracket may be received by the overhang when the pair of arcuate troughs are engaged with the bracket. Additionally, in some embodiments, radially-innermost surfaces of each of the arcuate peak and the pair of arcuate troughs may cooperate with the runner to at least partially define the overhang. In some embodiments still, the portion of the hanger may define a radially-innermost end of the hanger. The portion of the hanger may be non-undulated.

In some embodiments, the blade track segment may have a forward end and an aft end arranged aft of the forward end along the central axis, and the hanger may be spaced from each of the forward end and the aft end along the central axis. The blade track segment may have a middle portion located substantially midway between the forward and aft ends along the central axis, and the hanger may be spaced from the middle portion along the central axis.

In some embodiments, the pair of arcuate troughs may include a coating material forming radially-innermost surfaces of the arcuate troughs that engage the bracket so that the coating material may be ground down in order to control the points of engagement that locate the blade track segment relative to the carrier segment without grinding into ceramic matrix composite material of the blade track segment. The radially-innermost surfaces of the troughs may have a first thickness of coating material prior to engagement with the bracket and, surfaces of the undulated portion other than the radially-innermost surfaces of the troughs may have a second thickness of coating material, less than the first thickness, prior to engagement with the bracket.

According to another aspect of the present disclosure, an assembly adapted for use in a gas turbine engine may include a first component and a second component. The first component may comprise metallic materials and may form a bracket. The second component may comprise ceramic matrix composite materials and may form a body and a hanger. The hanger may include an undulated portion that has an arcuate peak and a pair of arcuate troughs. The pair of arcuate troughs may be configured to engage the bracket directly.

In some embodiments, the arcuate peak may define a radially-outermost end of the second component. The arcuate peak and the arcuate troughs may extend outwardly away from a portion of the hanger located radially inward of the radially-outermost end of the blade track segment along a central axis such that the arcuate troughs, the arcuate peak, and the body at least partially define an overhang. The portion of the hanger may define a radially-innermost end of the hanger. The portion of the hanger may be non-undulated.

In some embodiments, the second component may have a forward end and an aft end arranged aft of the forward end along a central axis, and the hanger may be spaced from each of the forward end and the aft end along the central axis. The second component may have a middle portion located substantially midway between the forward and aft ends along the central axis, and the hanger may be spaced from the middle portion along the central axis.

In some embodiments, the pair of arcuate troughs may include a coating material forming radially-innermost surfaces of the arcuate troughs that engage the bracket so that the coating material may be ground down in order to control the points of engagement that locate the second component relative to the first component without grinding into ceramic matrix composite material of the second component. The radially-innermost surfaces of the troughs may have a first thickness of coating material prior to engagement with the bracket, and surfaces of the undulated portion other than the radially-innermost surfaces of the troughs may have a second thickness of coating material, less than the first thickness, prior to engagement with the bracket.

These and other features of the present disclosure will become more apparent from the following description of the illustrative embodiments.

DETAILED DESCRIPTION OF THE DRAWINGS

Figure 1:
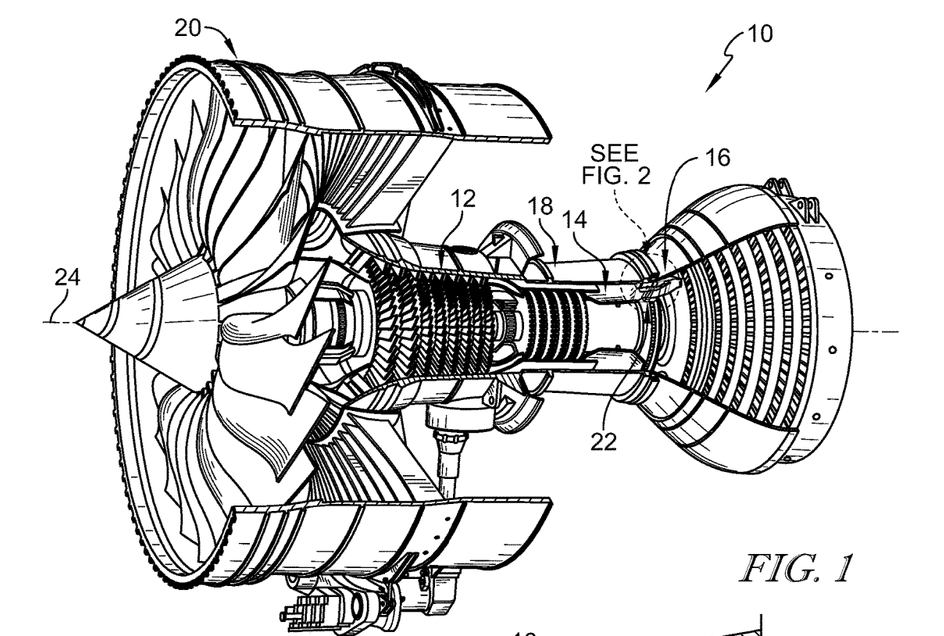
FIG. 1 is a cut-away perspective view of a gas turbine engine showing that the engine includes, from left to right, a fan, a compressor section, a combustor, and a turbine section adapted to drive the fan and the compressor section.

Referring now to FIG. 1, an illustrative gas turbine engine 10 adapted for use in an aircraft is shown. The gas turbine engine 10 includes a compressor 12, a combustor 14, and a turbine 16, each of which is surrounded by a metallic case 18. The gas turbine engine 10 also illustratively includes a fan 20. The compressor 12 compresses and delivers compressed air to the combustor 14. The combustor 14 mixes the compressed air with fuel, ignites the air-fuel mixture, and delivers the combustion products (i.e., hot, high-pressure gases) to the turbine 16. The turbine 16 converts the combustion products to mechanical energy (i.e., rotational power) that drives the compressor 12 and the fan 20.

Figure 2:
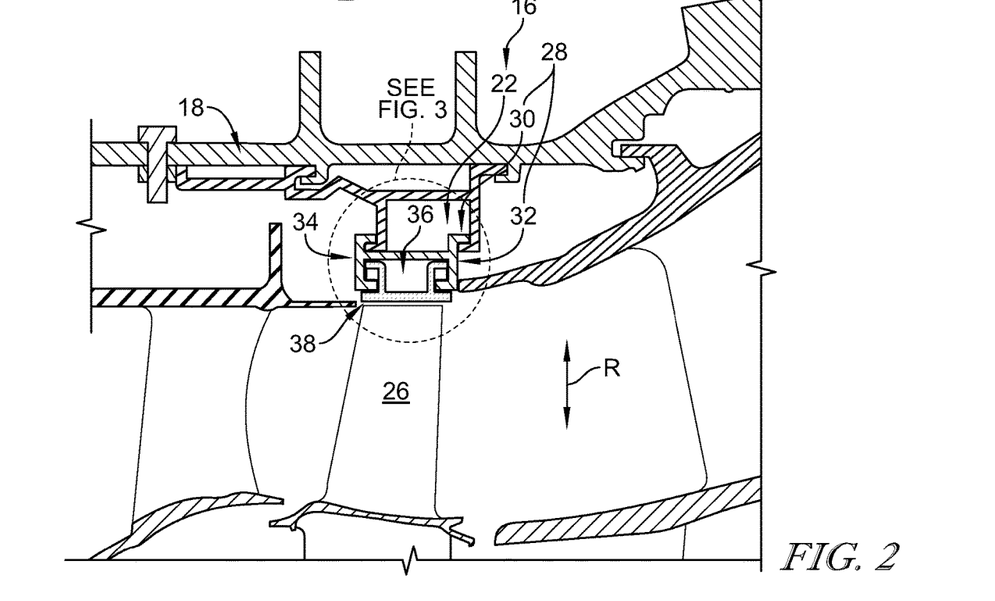
FIG. 2 is a sectional view of a portion of the turbine section included in the gas turbine engine of FIG. 1 showing that the turbine section includes a turbine shroud that extends around a rotating wheel to block gasses from passing over the blades of the wheel without interacting with the blades.

Referring now to FIG. 2, a portion of the illustrative turbine 16 is shown to include a turbine shroud 22 that extends around a central axis 24. The turbine shroud 22 blocks combustion products delivered to the turbine 16 from the combustor 14 from passing over rotatable blades 26 (one of which is shown in FIG. 2) included in the turbine 16 without causing the blades 26 to rotate. Combustion products that pass over the blades 26 without causing the blades 26 to rotate contribute to lost performance within the engine 10.

The turbine shroud 22 illustratively includes a carrier 28 as shown in FIG. 2. The carrier 28 extends circumferentially about the central axis 24 and is coupled to the metallic case 18. The carrier 28 is illustratively made up of a number of circumferentially adjacent carrier segments 34, but may be a full hoop in other embodiments. The carrier 28 includes an outer portion 30 coupled to the case 18 and an inner portion 32 that is located inward of the outer portion 30 in a radial direction indicated by arrow R. The inner portion 32 is formed to include a bracket 36 adapted for mounting other components.

Figure 3:
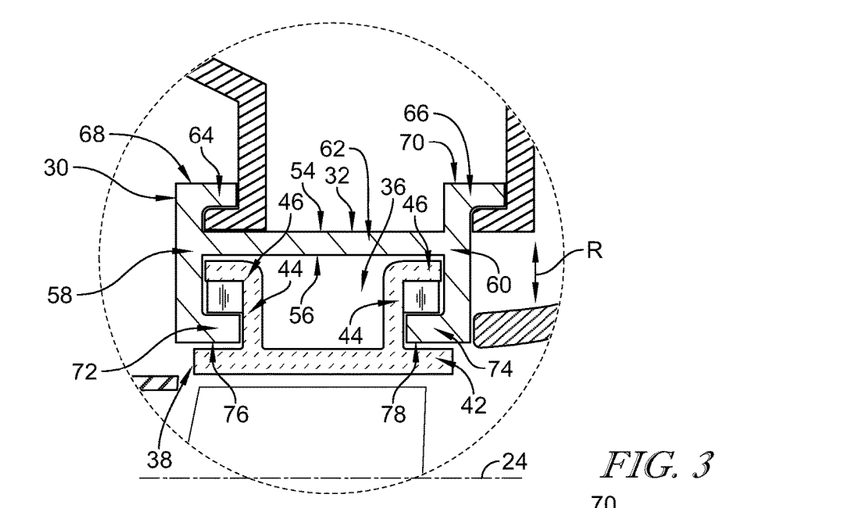
FIG. 3 is a detail view of a portion of FIG. 2 showing that the turbine shroud includes a carrier having a bracket and a blade track segment having hangers engaged with the bracket directly so that the blade track segment is supported by the carrier.
Figure 4:
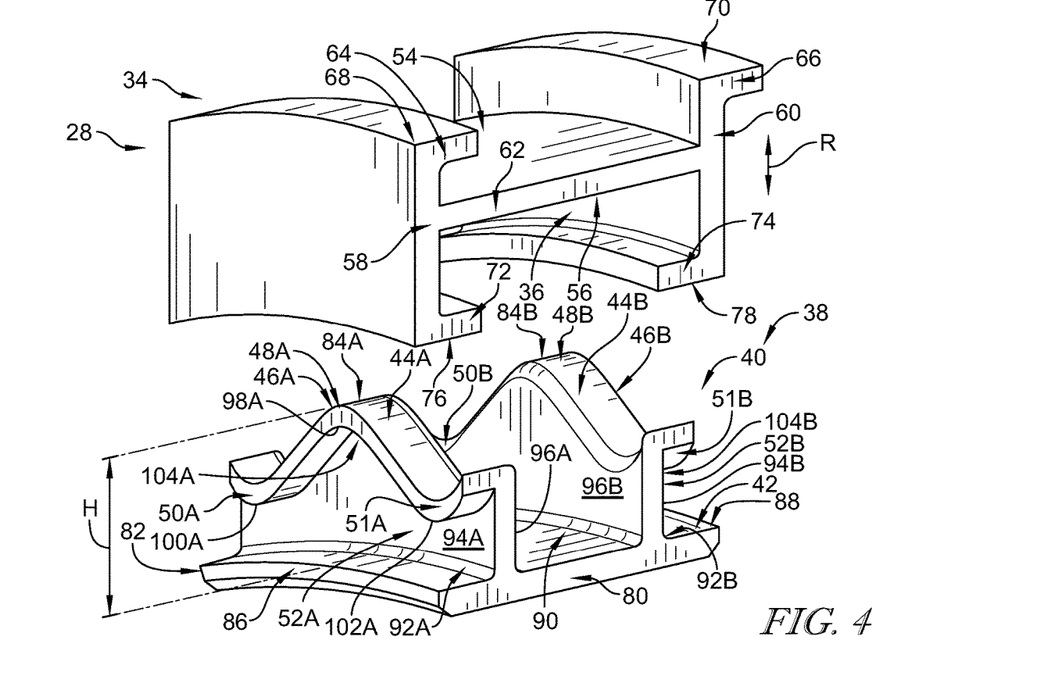
FIG. 4 is a perspective assembly view of a portion of the turbine shroud shown in FIG. 3 showing that the hangers of the blade track segments each include an undulated portion that has an arcuate peak and a pair of arcuate troughs interconnected with the arcuate peak and arranged opposite one another, and that the pair of arcuate troughs of each hanger are configured to engage the bracket of the carrier directly so that the blade track segment is supported by the carrier.

The turbine shroud 22 also illustratively includes a blade track 38 coupled to the inner portion 32 of the carrier 28 as shown in FIGS. 2 and 3. The blade track 38 includes blade track segments 40 that each have a runner 42 extending about the central axis 24 and hangers 44 extending outwardly in the radial direction away from the runner 42. As best seen in FIG. 4, the hangers 44 include undulated portions 46 that are adapted to stiffen the hangers 44. The stiffened hangers 44 are able to withstand greater stresses during operation of the gas turbine engine 10 than would be the case if the undulated portions 46 were omitted.

The undulated portion 46 of each hanger 44 illustratively includes an arcuate peak 48 and a pair of arcuate troughs 50, 51 that are interconnected with the peak 48 and arranged opposite one another as shown in FIG. 4. The troughs 50, 51 are configured to engage the bracket 36 of one of the carrier segments 34 directly so that each blade track segment 40 is supported by one of the carrier segments 34. Direct engagement between the troughs 50, 51 and the bracket 36 may be used to locate each blade track segment 40 relative to each carrier segment 34 during assembly of the turbine shroud 22. In some embodiments, more peaks and troughs may be formed by the undulated portion 46.

In the illustrative embodiment, the carrier 28 includes, or is otherwise constructed at least partially of, metallic materials. In other embodiments, however, the carrier 28 may include other suitable materials or have another suitable construction.

In the illustrative embodiment, the blade track 38 includes, or is otherwise constructed at least partially of, ceramic matrix composite materials. In other embodiments, however, the blade track 38 may include other suitable materials or have another suitable construction.

In the illustrative embodiment, each of the blade track segments 40 includes two hangers 44 that are formed in one-piece with the runner 42 and spaced from one another along the axis 24 as shown in FIGS. 3 and 4. In other embodiments, each of the segments 40 may include another suitable number of hangers 44 having another suitable arrangement along the axis 24. In those embodiments, each hanger 44 may be formed in one-piece with, or separately from, the runner 42 of each segment 40.

In some embodiments, the undulated portion 46 of each hanger 44 may not extend over an entire height H of each hanger 44 measured in the radial direction as shown in FIG. 4. Put differently, in some embodiments, each hanger 44 may have a non-undulated portion 52 that extends over at least a portion of the height H.

Referring now to FIGS. 3 and 4, one of the illustrative carrier segments 34 is shown in detail. The carrier segment 34 includes an outer portion 54 and an inner portion 56 located radially inward of the outer portion 54. The outer portion 54 is configured to interface indirectly with the case 18. The inner portion 56 is configured to interface with the hangers 44 of the blade track segment 40.

The outer portion 54 of the segment 34 illustratively includes a main wall 58, a main wall 60 spaced from the main wall 58 along the central axis 24, and a bridge 62 interconnecting the main walls 58, 60 as shown in FIGS. 3 and 4. The outer portion 54 also includes a flange 64 interconnected with and extending aftward along the axis 24 away from the main wall 58 and a flange 66 interconnected with and extending aftward along the axis 24 away from the main wall 60. The flanges 64, 66 define radially-outermost ends 68, 70 of the outer portion 54. The main wall 58, the bridge 62, and the flange 64 are configured to engage the outer portion 30. Additionally, the main wall 60 and the flange 66 are configured to engage the outer portion 30.

The inner portion 56 of the segment 34 illustratively includes the main wall 58, the main wall 60, and ledges 72, 74 as shown in FIGS. 3 and 4. The ledge 72 is interconnected with and extends aftward along the axis 24 away from the main wall 58 toward the ledge 74, whereas the ledge 74 is interconnected with and extends forward along the axis 24 away from the main wall 60 toward the ledge 72. The ledges 72, 74 define radially-innermost ends 76, 78 of the inner portion 56. The main wall 58 and the ledge 72 are configured to engage the arcuate troughs 50A, 51A of the hanger 44A, whereas the main wall 60 and the ledge 74 are configured to engage the troughs 50B, 51B of the hanger 44B. The main walls 58, 60, the ledges 72, 74, and the bridge 62 cooperatively define the bracket 36.

Referring now to FIG. 4, one of the illustrative blade track segments 40 is shown in detail. The hangers 44A, 44B illustratively extend from a circumferential end 80 of the segment 40 to a circumferential end 82 of the segment 40 arranged opposite the end 80. In some embodiments, however, the hangers 44A, 44B may be spaced from the circumferential ends 80, 82. The undulated portions 46A, 46B of the hangers 44A, 44B define radially-outermost ends 84A, 84B of the segment 40.

The blade track segment 40 illustratively has a forward end 86, an aft end 88 arranged aft of the forward end 86 along the central axis 24, and a middle portion 90 located substantially midway between the ends 86, 88 as shown in FIG. 4. Each of the hangers 44A, 44B is spaced from the forward and aft ends 86, 88 along the axis 24. Additionally, each of the hangers 44A, 44B is spaced from the middle portion 90 along the axis 24.

In some embodiments, the hangers 44A, 44B may have the non-undulated portions 52A, 52B interconnected with the runner 42 and the undulated portions 46A, 46B radially spaced from the runner 42 as shown in FIG. 4. In those embodiments, the non-undulated portions 52A, 52B may define radially-innermost ends 92A, 92B of the hangers 44A, 44B.

In other embodiments, the undulated portion 46 of each hanger 44 may be interconnected with the runner 42 so that the undulated portion 46 is not radially spaced from the runner 42. In those embodiments, the undulated portions 46 may define radially-innermost ends of the hangers 44.

The non-undulated portion 52 of each hanger 44 illustratively includes generally planar faces 94, 96 that are arranged opposite one another as shown in FIG. 4. The faces 94, 96 extend radially between the runner 42 and the undulated portion 46. The faces 94A, 94B of the hangers 44A, 44B face away from one another, whereas the faces 96A, 96B of the hangers 44A, 44B face toward one another.

The undulated portion 46 of each hanger 44 illustratively extends outwardly away from the face 94 of the non-undulated portion 52 as shown in FIG. 4. The undulated portion 46A of the hanger 44A extends outwardly away from the face 94A and forward thereof along the central axis 24. The undulated portion 46B of the hanger 44B extends outwardly away from the face 94B and aftward thereof along the central axis 24. The undulated portion 46A is configured to engage the ledge 72 directly, whereas the undulated portion 46B is configured to engage the ledge 74 directly.

The arcuate peak 48A of the hanger 44A illustratively includes a radially-innermost surface 98A as shown in FIG. 4. The arcuate troughs 50A, 51A of the hanger 44A include, respectively, radially-innermost surfaces 100A, 102A. The surfaces 98A, 100A, 102A extend outwardly away from the face 94A and forward thereof along the central axis 24 such that the surfaces 98A, 100A, 102A, and the runner 42 cooperate to at least partially define an overhang 104A. The overhang 104A is configured to receive the ledge 72 to permit the surfaces 100A, 102A to engage the ledge 72 directly.

The arcuate peak 48B and the arcuate troughs 50B, 51B of the hanger 44B are substantially identical to the arcuate peak 48A and the troughs 50A, 51A of the hanger 44A as shown in FIG. 4. Radially-innermost surfaces of the peak 48B and the troughs 50B, 51B extend outwardly away from the face 94B and aftward thereof along the central axis 24 such that the surfaces and the runner 42 cooperate to at least partially define an overhang 104B. The overhang 104B is configured to receive the ledge 74 to permit the radially-innermost surfaces of the troughs 50B, 51B to engage the ledge 74 directly.

Figure 5:
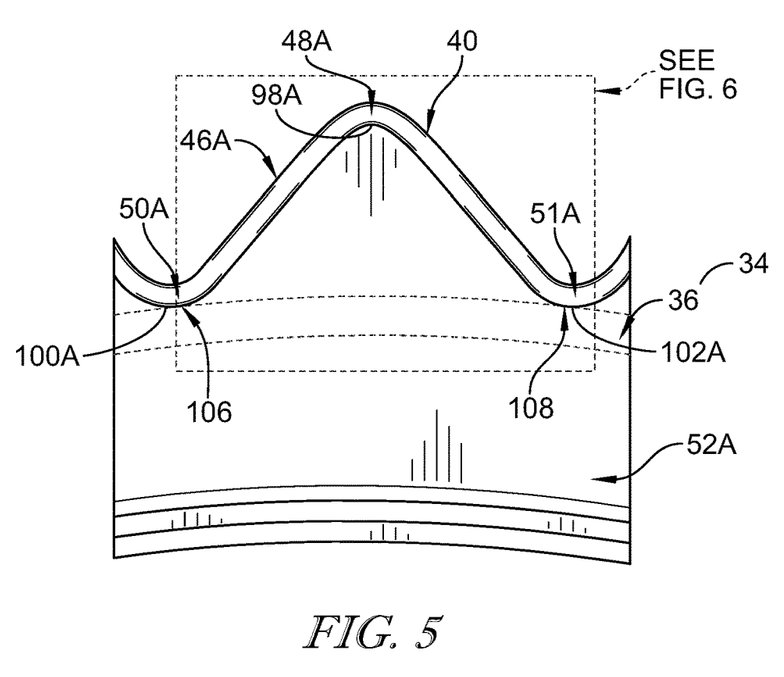
FIG. 5 is a front elevation view of the turbine shroud of FIG. 3 showing points of engagement between the bracket of the carrier and the arcuate troughs of one of the hangers of the blade track segment.

Referring now to FIG. 5, engagement between one of the carrier segments 34 (depicted in dashed lines) and one of the blade track segments 40 (depicted in solid lines) is shown. The bracket 36 of the carrier segment 34 is illustratively engaged directly with the radially-innermost surfaces 100A, 102A of the troughs 50A, 51A of the blade track segment 40 so that the blade track segment 40 is supported by the carrier segment 34. The bracket 36 is engaged with the surfaces 100A, 102A at respective engagement points 106, 108.

Figure 6:
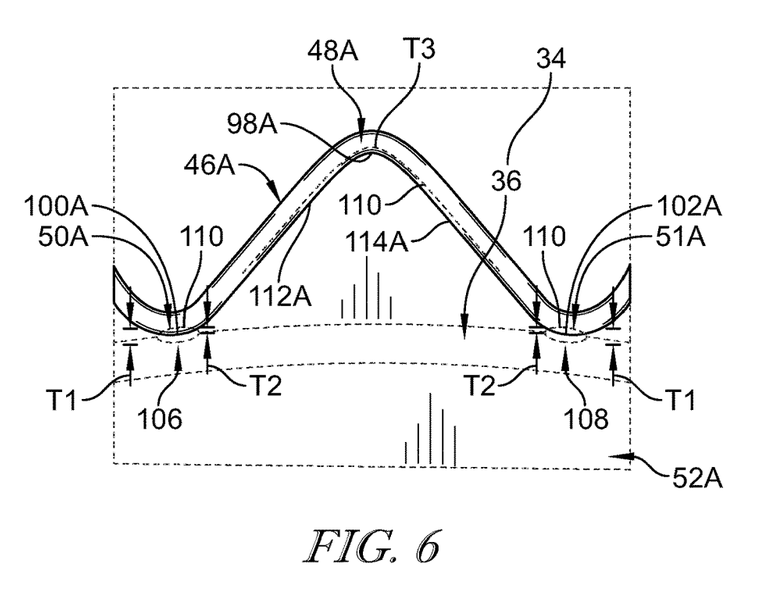
FIG. 6 is a detail view of the assembly of FIG. 5 showing that the arcuate troughs of one of the hangers include coating material that forms radially-innermost surfaces of the arcuate troughs, and that the radially-innermost surfaces engage the bracket of the carrier so that the coating material can be ground down to control the points of engagement and location of the blade track segment.

Referring now to FIG. 6, the engagement points 106, 108 between the carrier segment 34 and the blade track segment 40 are shown in detail. The arcuate troughs 50A, 51A illustratively include a coating material 110 that forms the radially-innermost surfaces 100A, 102A. When the surfaces 100A, 102A are engaged with the bracket 36 at or near the engagement points 106, 108, the coating material 110 can be ground down to control engagement at or near the points 106, 108, thereby locating the blade track segment 40 relative to the carrier segment 34. Engagement control at or near the points 106, 108 permits the blade track segment 40 to be located relative to the carrier segment 34 without grinding into the ceramic matrix composite material of the segment 40.

The coating material 110 is illustratively embodied as, or otherwise includes, a thermal barrier coating or an environmental barrier coating. In other embodiments, however, the coating material 110 may be embodied as, or otherwise include, another suitable coating, unreinforced matrix, or the like.

Prior to engagement with the bracket 36 of the carrier segment 34, the arcuate troughs 50A, 51A may have a thickness T1 of coating material 110 that forms the radially-innermost surfaces 100A, 102A as shown by FIG. 6. After the coating material 110 has been ground down at or near the engagement points 106, 108 (i.e., following engagement with the bracket 36), the arcuate troughs 50A, 51A may have a thickness T2 of coating material 110 that forms the surfaces 100A, 102A. The thickness T2 may be less than the thickness T1 as suggested by FIG. 6.

In some embodiments, surfaces of the undulated portion 46A of the blade track segment 40 other than the radially-innermost surfaces 100A, 102A of the troughs 50A, 51A may be formed by, or have applied thereto, the coating material 110 as shown by FIG. 6. In one example, the coating material 110 may form the radially-innermost surface 98A of the peak 48. In another example, the coating material 110 may form a surface 112A located between the radially-innermost surface 100A of the trough 50A and the surface 98A. In yet another example, the coating material 110 may form a surface 114A located between the surface 98A and the radially-innermost surface 102A of the trough 51A. In any case, surfaces of the undulated portion 46 other than the surfaces 100A, 102A may have a thickness T3 of coating material 110 both prior to, and following, engagement between the blade track segment 40 and the carrier segment 34. The thickness T3 may be less than the thickness T1 as suggested by FIG. 6.

Figure 7:
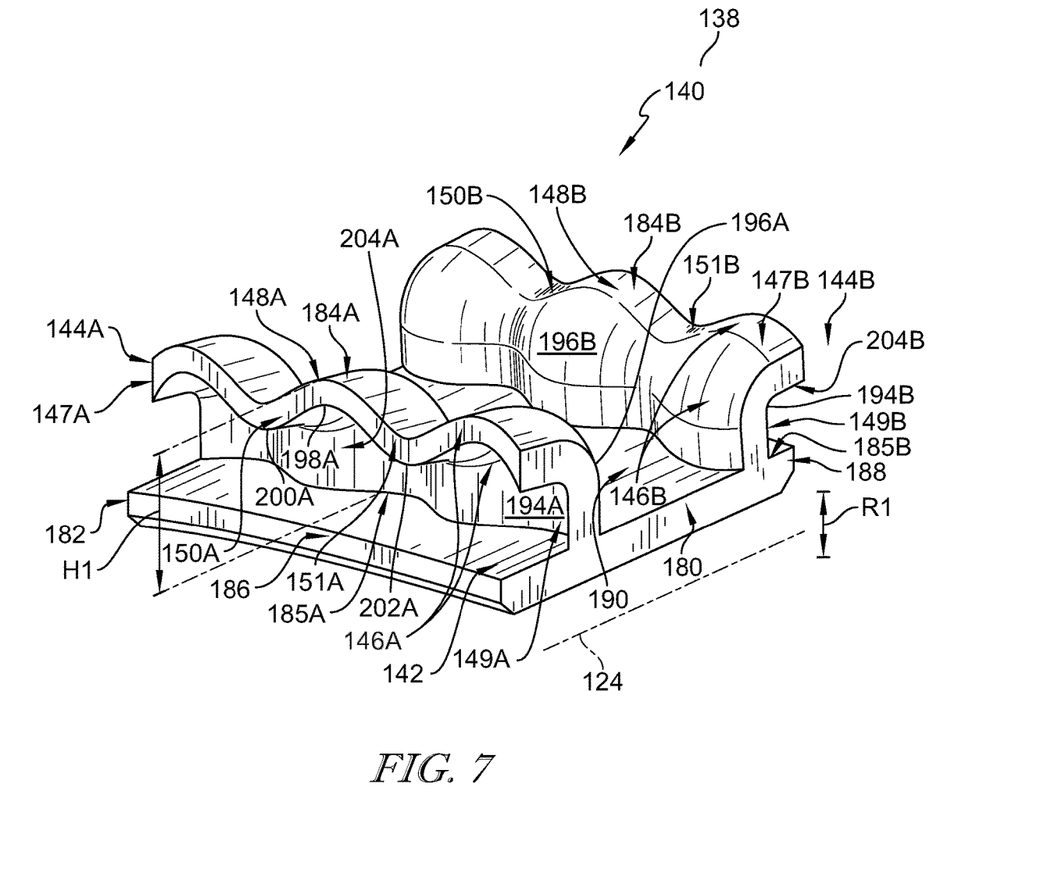
FIG. 7 is a perspective view of another blade track segment adapted for use in the gas turbine engine of FIG. 1 showing that the blade track segment includes hangers having undulated portions that extend over the entire height of the hangers measured in a radial direction.

Referring now to FIG. 7, another illustrative blade track segment 140 of a blade track 138 adapted for in the turbine shroud 22 is shown in detail. The blade track segment 140 includes hangers 144A, 1448 having respective undulated portions 146A, 146B that extend over an entire height H1 of each of the hangers 144A, 144B measured in a radial direction R1. In other words, unlike the hangers 44 of the blade track segment 40, the hangers 144 of the blade track segment 140 do not include non-undulated portions that extend over at least a portion of the height H1 of each hanger 144.

The blade track segment 140 illustratively includes a runner 142 that extends about a central axis 124 and the hangers 144 that extend outwardly in the radial direction R1 away from the runner 142. The undulated portions 146 of the hangers 144 are adapted to stiffen the hangers 144. The stiffened hangers 144 are able to withstand greater stresses during operation of the gas turbine engine 10 than would be the case if the undulated portions 146 were omitted.

The undulated portion 146 of each hanger 144 illustratively includes an outer segment 147 that has an arcuate peak 148 and a pair of arcuate troughs 150, 151 that are interconnected with the peak 148 and arranged opposite one another as shown in FIG. 7. The troughs 150, 151 are configured to engage one of the carrier segments 34 (e.g., the bracket 36) directly so that each blade track segment 140 is supported by one of the carrier segments 34. Direct engagement between the troughs 150, 151 and the carrier segment 34 may be used to locate each blade track segment 140 relative to each carrier segment 34 during assembly of the turbine shroud 22.

In the illustrative embodiment, the blade track 138 includes, or is otherwise constructed at least partially of, ceramic matrix composite materials. In other embodiments, however, the blade track 138 may include other suitable materials or have another suitable construction.

In the illustrative embodiment, the blade track segment 140 includes two hangers 144 that are formed in one-piece with the runner 142 and spaced from one another along the axis 124 as shown in FIG. 7. In other embodiments, the segment 140 may include another suitable number of hangers 144 having another suitable arrangement along the axis 124. In those embodiments, each hanger 144 may be formed in one-piece with, or separately from, the runner 142 of the segment 140.

The hangers 144A, 144B illustratively extend from a circumferential end 180 of the segment 140 to a circumferential end 182 of the segment 140 arranged opposite the end 180 as shown in FIG. 7. In some embodiments, however, the hangers 144A, 144B may be spaced from the circumferential ends 180, 182. The undulated portions 146A, 1468 of the hangers 144A, 1448 define radially-outermost ends 184A, 1848 of the segment 140 and radially-innermost ends 185A, 1858 of the segment 140.

The blade track segment 140 illustratively has a forward end 186, an aft end 188 arranged aft of the forward end 186 along a central axis 124, and a middle portion 190 located substantially midway between the ends 186, 188 as shown in FIG. 7. Each of the hangers 144A, 144B is spaced from the forward and aft ends 186, 188 along the axis 124. Additionally, each of the hangers 144A, 144B is spaced from the middle portion 190 along the axis 124.

The undulated portion 146 of each hanger 144 illustratively includes an inner segment 149 located radially inward of the outer segment 147 as shown in FIG. 7. The inner segment 149 has undulated faces 194, 196 that are arranged opposite one another. The undulated faces 194, 196 extend radially between the runner 142 and the outer segment 147. The undulated faces 194A, 1948 of the hangers 144A, 1448 face away from one another, whereas the undulated faces 196A, 1968 of the hangers 144A, 1448 face toward one another.

The outer segment 147 of each hanger 144 illustratively extends outwardly away from the undulated face 194 of the inner segment 149 as shown in FIG. 7. The outer segment 147A of the hanger 144A extends outwardly away from the face 194A and forward thereof along the central axis 124. The outer segment 147B of the hanger 144B extends outwardly away from the face 194B and aftward thereof along the central axis 124.

The arcuate peak 148A of the hanger 144A illustratively includes a radially-innermost surface 198A as shown in FIG. 7. The arcuate troughs 150A, 151A of the hanger 144A include, respectively, radially-innermost surfaces 200A, 202A. The surfaces 198A, 200A, 202A extend outwardly away from the undulated face 194A and forward thereof along the central axis 124 such that the surfaces 198A, 200A, 202A, and the runner 142 cooperate to at least partially define an overhang 204A.

The arcuate peak 148B and the arcuate troughs 150B, 151B of the hanger 144B are substantially identical to the arcuate peak 148A and the troughs 150A, 151A of the hanger 144A as shown in FIG. 7. Radially-innermost surfaces of the peak 148B and the troughs 150B, 151B extend outwardly away from the face 194B and aftward thereof along the central axis 124 such that the surfaces and the runner 142 cooperate to at least partially define an overhang 204B.

In some embodiments, rather than being adapted for use in the turbine 16, some of the components described above may be adapted for use in other parts of the gas turbine engine 10. For example, some of the components may be adapted for use in the combustor 14 of the engine 10. Use of the components in the combustor 14 is described in greater detail below.

The components 28, 38, described above as the respective carrier 28 and blade track 38, may be adapted for use in the combustor 14. Specifically, the components 28, 38 may be adapted for use in, respectively, a shell and a liner of the combustor 14. The shell may be formed from one or more shell segments that each include metallic materials, whereas the liner may be formed from one or more liner segments that each include ceramic matrix composite materials. The shell may define a cavity that extends around the central axis 24, and the liner may be arranged inside the cavity and extend around a combustion chamber in which the mixture of compressed air and fuel is ignited to produce the hot, high-pressure gases that drive the engine 10.

Some sub-components of the components 34, 40 may be adapted for use as sub-components of respective shell segments and liner segments of the combustor 14. For example, the component 36 may be adapted for use as a bracket of one shell segment, and the components 42, 44 may be adapted for use, respectively, as a body and hanger of one liner segment. In that example, the portion 46 may be adapted for use as an undulated portion of the hanger of the liner segment. The undulated portion of the hanger of the liner segment may be configured to engage the bracket of the shell segment directly so that the liner segment is supported by the shell segment.

Ceramic matrix composite (CMC) seal segments (e.g., the blade track segments 40) may have lower allowable stresses than metal seal segments. Due to the high pressures and temperatures in the turbine region of a gas turbine engine (e.g., the turbine 16), use of CMC materials may present a number of difficulties. In particular, use of CMC materials in hanger features of the segments (e.g., the hangers 44) may be difficult because the allowable stresses of the CMC materials may be exceeded when used in the hanger features.

Stresses experienced by CMC materials used in the hanger features may be decreased by increasing the stiffness of the hanger features. Specifically, waves or corrugations (e.g., the undulated portions 46 of the blade track 38) may be incorporated into the hanger features to increase the stiffness of the hanger features.

One benefit of the present design may be that the stiffness of the hanger features may be increased without modification to the materials of construction (i.e., the CMC materials) of the hanger features. Another benefit of the present design may be that the stiffness of the hanger features may be increased without modification to mating hardware.

A significant attribute of the present design may be increased stiffness to a CMC part that is accomplished through a physical modification to the hanger features, rather than a modification to the CMC materials of the hanger features. The increased stiffness may be accomplished by incorporating waves, or corrugations, into the hanger features. The present design may be applicable to other portions of a gas turbine engine (e.g., the combustor 14) that use hangers as attachment features.

In some embodiments, the corrugations may extend in the horizontal direction (e.g., between the circumferential ends 80, 82) and not over the entire vertical height (e.g., the height H) of the hanger feature. In other embodiments, the corrugations may extend over the entire vertical height of the hanger feature to further increase stiffness of the hanger feature.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
a carrier including a carrier segment formed to include a bracket, and
a blade track segment comprising ceramic matrix composite material and including a runner extending about a central axis and a hanger extending outwardly in a radial direction away from the runner, the hanger having an undulated portion adapted to stiffen the hanger that has an arcuate peak and a pair of arcuate troughs interconnected with the arcuate peak and arranged opposite one another, wherein the pair of arcuate troughs are configured to engage the bracket directly so that the blade track segment is supported by the carrier segment.

2. The turbine shroud of claim 1, wherein the undulated portion defines a radially-outermost end of the blade track segment.

3. The turbine shroud of claim 2, wherein the arcuate peak and the pair of arcuate troughs extend outwardly away from a portion of the hanger located radially inward of the radially-outermost end of the blade track segment along the central axis such that the arcuate peak, the pair of arcuate troughs, and the runner cooperate to at least partially define an overhang.

4. The turbine shroud of claim 3, wherein the bracket is received by the overhang when the pair of arcuate troughs are engaged with the bracket.

5. The turbine shroud of claim 3, wherein radially-innermost surfaces of each of the arcuate peak and the pair of arcuate troughs cooperate with the runner to at least partially define the overhang.

6. The turbine shroud of claim 3, wherein the portion of the hanger defines a radially-innermost end of the hanger.

7. The turbine shroud of claim 6, wherein the portion of the hanger is non-undulated.

8. The turbine shroud of claim 1, wherein the blade track segment has a forward end and an aft end arranged aft of the forward end along the central axis and the hanger is spaced from each of the forward end and the aft end along the central axis.

9. The turbine shroud of claim 8, wherein the blade track segment has a middle portion located substantially midway between the forward and aft ends along the central axis and the hanger is spaced from the middle portion along the central axis.

10. The turbine shroud of claim 1, wherein the pair of arcuate troughs include a coating material forming radially-innermost surfaces of the arcuate troughs that engage the bracket so that the coating material can be ground down in order to control the points of engagement that locate the blade track segment relative to the carrier segment without grinding into ceramic matrix composite material of the blade track segment.

11. The turbine shroud of claim 10, wherein the radially-innermost surfaces of the troughs have a first thickness of coating material prior to engagement with the bracket and surfaces of the undulated portion other than the radially-innermost surfaces of the troughs have a second thickness of coating material, less than the first thickness, prior to engagement with the bracket.

12. An assembly adapted for use in a gas turbine engine, the assembly comprising
a first component comprising metallic materials forming a bracket, and
a second component comprising ceramic matrix composite materials forming a body and a hanger, the hanger including an undulated portion that has an arcuate peak and a pair of arcuate troughs, wherein the pair of arcuate troughs are configured to engage the bracket directly.

13. The assembly of claim 12, wherein the arcuate peak defines a radially-outermost end of the second component.

14. The assembly of claim 13, wherein the arcuate peak and the arcuate troughs extend outwardly away from a portion of the hanger located radially inward of the radially-outermost end of the blade track segment along a central axis such that the arcuate troughs, the arcuate peak, and the body at least partially define an overhang.

15. The assembly of claim 14, wherein the portion of the hanger defines a radially-innermost end of the hanger.

16. The assembly of claim 15, wherein the portion of the hanger is non-undulated.

17. The assembly of claim 12, wherein the second component has a forward end and an aft end arranged aft of the forward end along a central axis and the hanger is spaced from each of the forward end and the aft end along the central axis.

18. The assembly of claim 17, wherein the second component has a middle portion located substantially midway between the forward and aft ends along the central axis and the hanger is spaced from the middle portion along the central axis.

19. The assembly of claim 12, wherein the pair of arcuate troughs include a coating material forming radially-innermost surfaces of the arcuate troughs that engage the bracket so that the coating material can be ground down in order to control the points of engagement that locate the second component relative to the first component without grinding into ceramic matrix composite material of the second component.

20. The assembly of claim 19, wherein the radially-innermost surfaces of the troughs have a first thickness of coating material prior to engagement with the bracket and surfaces of the undulated portion other than the radially-innermost surfaces of the troughs have a second thickness of coating material, less than the first thickness, prior to engagement with the bracket.

* * * * *